United States Patent [19]
Basek

[11] 3,774,732
[45] Nov. 27, 1973

[54] SPROCKET-ACTUATED BICYCLE BRAKE
[75] Inventor: Charles Basek, Granby, Quebec, Canada
[73] Assignee: Raleigh Industries of Canada Limited, Les Industries Raleigh Du Canada Limitee, Waterloo, Quebec, Canada
[22] Filed: Apr. 25, 1972
[21] Appl. No.: 247,382

[52] U.S. Cl. .................................. 188/24, 188/134
[51] Int. Cl. ............................................. B62l 5/00
[58] Field of Search ........................ 188/24, 26, 134

[56] References Cited
FOREIGN PATENTS OR APPLICATIONS
1,022,084   12/1952   France ................................. 188/24
  691,582    5/1953   Great Britain ....................... 188/24

Primary Examiner—Duane A. Reger
Attorney—Neil W. McDermid et al.

[57] ABSTRACT

A forwardly and rearwardly movable brake member is pivoted to a bicycle frame and includes a brake shoe portion which frictionally engages the rear wheel when the brake member is moved rearwardly. An elongated pawl is pivoted to the brake member and extends forwardly to engage the teeth of a pedal-actuated sprocket which is drivingly connected to the rear wheel. During forward motion the pawl skips over the sprocket teeth, but when the sprocket rotation is reversed, the pawl moves the brake member rearwardly to frictionally engage the brake shoe portion with the rear wheel.

8 Claims, 3 Drawing Figures

PATENTED NOV 27 1973　　3,774,732

SPROCKET-ACTUATED BICYCLE BRAKE

This invention relates to new and useful improvements in bicycle brakes, and the principal object of the invention is to provide a very simple but highly efficient brake which is operative upon the periphery of the rear wheel of a bicycle and eliminates the conventional, more complicated and expensive brake mechanism in the hub of the rear wheel.

Although peripheral wheel brakes are well known in the bicycle art, such conventional brakes are usually actuated through Bowden cables connected to hand grips on the handle bar. While this is generally satisfactory, it has some disadvantages in that the hand of the rider is called upon to produce the braking action and is thus less effective in its primary function of holding the handle bar and steering. This disadvantage is not encountered in the other conventional arrangement where the brake is built-in the hub of the rear wheel and is actuated by reverse rotation of the pedal-equipped sprocket drivingly connected to the rear wheel, but as already noted, the conventional hub type brake is complicated and expensive to manufacture. Moreover, if the chain connecting the pedal-equipped sprocket to the rear wheel should be broken, the hub type is completely inoperative.

An important feature of the invention is that it combines the advantages of a peripheral wheel brake with those of actuation by the pedal-equipped sprocket, while eliminating the disadvantages of both. As such, the brake of the invention is simple in that it consists of very few parts, and is dependable in operation even if the wheel driving chain should become broken.

Although the brake of the invention is primarily intended for use as simple brake mechanism on small bicycles for children and the like, it may also be applied as an attachment for bicycles in general, including those which are already equipped with a conventional hub type brake.

With the foregoing more important object and features in view and such other objects and features which may become apparent as this specification proceeds, the invention will be understood from the following description taken in conjunction with the accompanying drawings, in which like characters of reference designate like parts, and in which.

Figure 1:
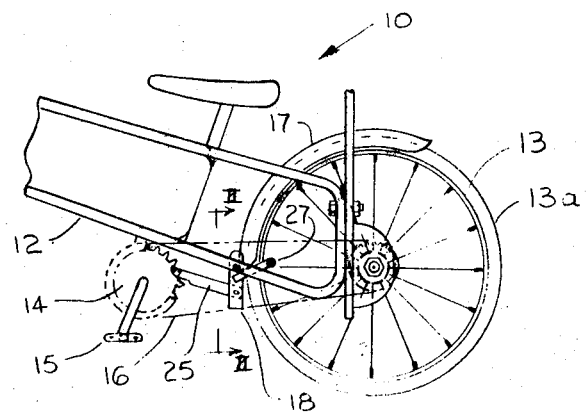
FIG. 1 is a fragmentary side elevational view of a bicycle equipped with the brake of the invention.

Referring now to the accompanying drawings in detail, the general reference numeral 10 designates a bicycle of a conventional construction including a frame 12, a rear wheel 13 and a sprocket 14 which is equipped with the usual pedals 15 and is drivingly connected by an endless chain 16 to the rear wheel 13. The rear wheel is provided with the usual fender 17 which in the context of this description and accompanying claims may be regarded as a component of the frame 12.

Figures 2, 3:
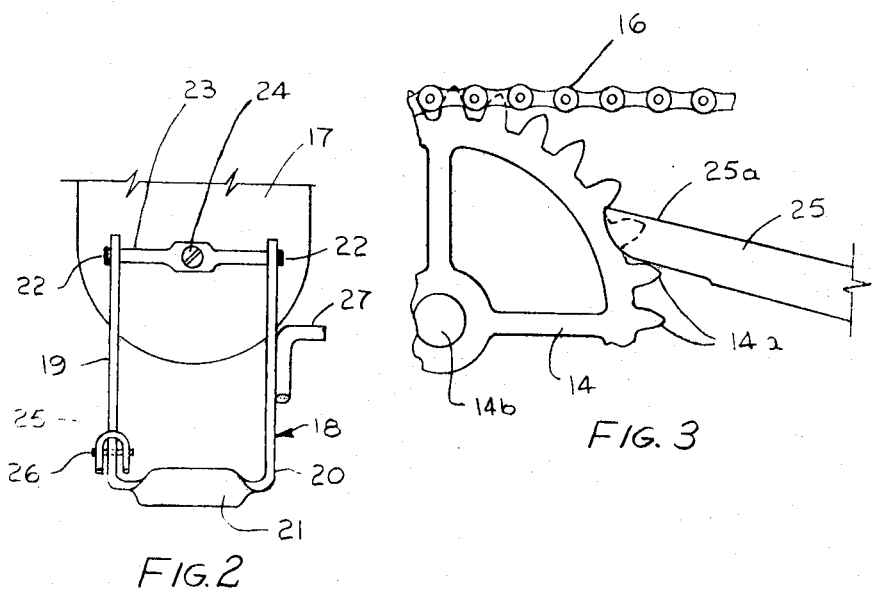
FIG. 2 is an enlarged fragmentary detail, taken substantially in the plane of the line 2—2 in FIG. 1.
FIG. 3 is an enlarged fragmentary side elevational view of the sprocket and pawl.

The brake of the invention comprises a substantially U-shaped brake member 18 which is pivotally attached to the frame 12 at a point generally between the rear wheel 13 and the sprocket 14. As shown in FIG. 2, the brake member 18 includes a pair of transversely spaced arms 19, 20 having their lower ends connected by a bight portion 21. The upper ends of these arms are connected by pivots 22 to a mounting bracket 23 which is rigidly secured to the frame 12 by one or more bolts 24. Conveniently, the bracket 23 may be secured to the front lower end of the fender 17 so that the brake member 18 is disposed immediately forwardly of the rear wheel 13 and projects below the fender. However, if desired, the bracket may be secured directly to the frame 12, rather than to the fender.

The brake member 18 is movable about the pivots 22 forwardly and rearwardly. The bight portion 21 of the brake member is flattened as shown in FIG. 2 and constitutes a brake shoe which is frictionally engageable with the periphery of the rear wheel 13 when the brake member is moved rearwardly. Manifestly, the wheel 13 is provided with the usual tire 13a and the brake shoe 21 is frictionally engageable with the outer periphery of the tire.

An elongated pawl 25 is pivoted as at 26 to the arm 19 of the brake member 18, at a point adjacent the brake shoe 21. The pawl 25 extends forwardly and its front end portion 25a engages the teeth 14a of the sprocket 14 at a point rearwardly of and above the axis of rotation 14b of the sprocket, as shown in FIG. 3. For most part of its length, or at least in its front end portion 25a, the pawl 25 is of an inverted U-shaped cross-section as shown in FIG. 2. This provides an inverted channel in which the sprocket teeth 14a are received, and lateral displacement of the pawl relative to the sprocket is thereby prevented.

In operation, when the sprocket 14 is rotated so as to drive the rear wheel 13 forwardly, the brake member 18 hangs in its forward, substantially vertical position by gravity and the brake shoe 21 is disengaged from the periphery of the rear wheel 13. In this position the front end portion 25a of the pawl 25 simply skips over the sprocket teeth 14a and the forward rotation of the sprocket creates a certain amount of drag on the pawl to assist in maintaining the brake member 18 in its forward or inoperative position.

However, when the brake is to be applied, the sprocket 14 is rotated to some extent in the rearward or reverse direction, and this causes one of the sprocket teeth 14a to engage the front end 25a of the pawl 25 and push the same rearwardly, thus swinging the brake member 18 rearwardly about the pivots 22 and pressing the brake shoe 21 into frictional engagement with the periphery of the wheel 13.

Means are provided to prevent forward movement of the brake member 18 and pawl 25 beyond practical limits in relation to the sprocket 14, thus assuring that the pawl 25 always engages the sprocket at an effective point for proper ratchet action and does not interfere with the chain 16. These means comprise a stop arm or lever 27 which is rigidly secured to the arm 20 of the brake member 18 and is appropriately angulated so that when the brake member 18 moves forwardly to a predetermined limit, the stop arm 27 comes into abutment with the frame 12 and further forward travel of the brake member and pawl 25 is prevented.

It may be noted that the entire brake of the invention is readily applicable to the bicycle and may be quickly and easily installed inasmuch as the mounting bracket 23 constitutes the sole means for attaching the brake mechanism to the bicycle frame.

While in the foregoing there has been described and shown the preferred embodiment of the invention, various modifications and equivalents may be resorted to within the spirit and scope of the invention as claimed.

What is claimed as new is:

1. In a bicycle including a frame, a rear wheel and a pedal-actuated sprocket drivingly connected to said rear wheel, a sprocket-actuated rear wheel brake comprising in combination, a brake member which is substantially U-shaped and includes a pair of transversely spaced arms and a connecting bight portion which constitutes a brake shoe portion, said spaced arms being pivotally connected to said frame at a point generally between said sprocket and said rear wheel, said brake member being pivotally movable forwardly and rearwardly about said pivot connection such that said brake shoe portion is frictionally engageable with the rear wheel when the brake member is moved rearwardly, and an elongated pawl pivoted to said brake member and extending forwardly therefrom, the front end of said pawl engaging the teeth of said sprocket so that when the sprocket is rotated to drive the rear wheel forwardly, the pawl skips over the sprocket teeth but when the sprocket is rotated in the reverse direction, the pawl moves the brake member rearwardly to frictionally engage said brake shoe portion with the rear wheel.

2. The combination as defined in claim 1 together with stop means provided on said brake member and engageable with said frame to limit forward movement of the brake member.

3. The combination as defined in claim 1, said pawl being pivoted to one of said arms, together with a mounting bracket secured to said frame and having said arms pivotally connected thereto.

4. The combination as defined in claim 1 wherein at least the front end portion of said pawl is of an inverted U-shaped cross-section and defines a channel in which the teeth of said sprocket are received.

5. A brake attachment for a bicycle which includes a frame, a rear wheel and a pedal-actuated sprocket drivingly connected to the rear wheel, said brake attachment comprising a brake member which is substantially U-shaped and includes a pair of transversely spaced arms and a connecting bight portion which constitutes a brake shoe portion, said spaced arms adapted to be pivotally connected to a bicycle frame for forward and rearward movement about said pivot connection, said brake shoe portion adapted to frictionally engage a rear wheel when the brake member is moved rearwardly, and an elongated pawl pivoted to said brake member and extending forwardly therefrom, the front end of said pawl being adapted to engage the teeth of a pedal-actuated sprocket so that when the sprocket is rotated to drive the rear wheel forwardly, the pawl skips over the sprocket teeth but when the sprocket is rotated in the reverse direction, the pawl moves the brake member rearwardly for frictional engagement of said brake shoe portion with the rear wheel.

6. The brake attachment as defined in claim 5 together with stop means provided on said brake member and adapted to engage the frame to limit forward movement of the brake member.

7. The brake attachment as defined in claim 5, said pawl being pivoted to one of said arms, together with a mounting bracket adapted to be secured to the frame and having said arms pivotally connected thereto.

8. The brake attachment as defined in claim 5 wherein at least the front end portion of said pawl is of an inverted U-shaped cross-section and defines a sprocket tooth receiving channel.

* * * * *